United States Patent
Kim et al.

(10) Patent No.: US 12,474,234 B2
(45) Date of Patent: Nov. 18, 2025

(54) ARTIFICIAL INTELLIGENCE-BASED APPLIANCE MANAGEMENT DEVICE AND APPLIANCE MANAGEMENT METHOD

(71) Applicant: LG Electronics Inc., Seoul (KR)

(72) Inventors: Shinae Kim, Seoul (KR); Jihyun Song, Seoul (KR); Hyosang Shin, Seoul (KR); Wonjae Hyun, Seoul (KR)

(73) Assignee: LG Electronics Inc., Seoul (KR)

( * ) Notice: Subject to any disclaimer, the term of this patent is extended or adjusted under 35 U.S.C. 154(b) by 852 days.

(21) Appl. No.: 17/625,009

(22) PCT Filed: Jul. 5, 2019

(86) PCT No.: PCT/KR2019/008322
§ 371 (c)(1),
(2) Date: Jan. 5, 2022

(87) PCT Pub. No.: WO2021/006369
PCT Pub. Date: Jan. 14, 2021

(65) Prior Publication Data
US 2022/0260461 A1    Aug. 18, 2022

(51) Int. Cl.
*G01M 99/00*       (2011.01)
*G06F 40/279*     (2020.01)
(Continued)

(52) U.S. Cl.
CPC ......... *G01M 99/008* (2013.01); *G06F 40/279* (2020.01); *G08B 21/18* (2013.01);
(Continued)

(58) Field of Classification Search
CPC ...... G01M 99/008; G06F 3/16; G06F 40/279; G06F 40/284; G06F 40/30; G06N 20/00;
(Continued)

(56) References Cited

U.S. PATENT DOCUMENTS

2002/0095269 A1*  7/2002  Natalini .............. H04L 43/0817
                                                           702/188
2011/0218957 A1*  9/2011  Coon ................. G06Q 30/0601
                                                           715/708
(Continued)

FOREIGN PATENT DOCUMENTS

CA    2714804 A1 *  9/2011  ......... G06Q 30/0601
JP    2006011718       1/2006
(Continued)

OTHER PUBLICATIONS

Moriya, JP 2009110300, English Translation (Year: 2009).*
(Continued)

*Primary Examiner* — Michael J Dalbo
(74) *Attorney, Agent, or Firm* — Fish & Richardson P.C.

(57) ABSTRACT

According to an embodiment, an appliance management device includes a communication device configured to acquire symptom information of a first appliance from a user's terminal, a memory including a database for accumulatively storing log data of each of appliances matched with the user, and a processor, wherein the processor may acquire log data of the first appliance among the log data of each of the appliances of the user based on the acquired symptom information, identify at least one piece of information related to the symptom information among a plurality of pieces of information included in the acquired log data, generate diagnostic information on the symptom information based on a result of identification, and transmit the generated diagnostic information to the terminal.

20 Claims, 9 Drawing Sheets

(51) Int. Cl.
*G08B 21/18* (2006.01)
*G10L 15/08* (2006.01)
*H04L 12/28* (2006.01)

(52) U.S. Cl.
CPC .......... *G10L 15/08* (2013.01); *H04L 12/2825* (2013.01); *G10L 2015/088* (2013.01)

(58) Field of Classification Search
CPC .......... G06N 3/08; G08B 21/18; G06Q 10/00; G06Q 50/10; G10L 15/08; G10L 2015/088
See application file for complete search history.

(56) References Cited

U.S. PATENT DOCUMENTS

| | | | |
|---|---|---|---|
| 2014/0156082 A1* | 6/2014 | Ha | H04L 12/2818 700/275 |
| 2016/0102877 A1* | 4/2016 | Griffin | F24F 11/38 700/276 |
| 2019/0196893 A1* | 6/2019 | Lee | G06F 11/0751 |
| 2020/0244476 A1* | 7/2020 | Kim | H04W 88/08 |

FOREIGN PATENT DOCUMENTS

| | | |
|---|---|---|
| JP | 2014215837 | 11/2014 |
| JP | 2019083414 | 5/2019 |
| KR | 20140007178 A | 1/2014 |
| KR | 20160006832 | 1/2016 |
| KR | 20190043258 | 4/2019 |

OTHER PUBLICATIONS

Oku, JP 2014215837, English Translation (Year: 2014).*
KhA, RU 2574359, English Translation (Year: 2016).*
Office Action in Korean Appln. No. 10-2021-7034062, mailed on Jun. 26, 2025, 17 pages (with English translation).

* cited by examiner

TABLE1

| | Classification | Symptom | Phenomenon |
|---|---|---|---|
| 1 | Odor | Occurrence of odor | (Phenomenon 1)<br><br>Identify residual detergent amount<br>Average residual detergent amount >=6? |
| 2 | | | (Phenomenon 2)<br><br>Identify whether door is open<br>Number of door openings <=3? |

| Laundry time | Residual detergent amount | Clothing amount | Door open (0:closed/ 1:open) | Average residual detergent amount | Average clothing amount |
|---|---|---|---|---|---|
| 2018-04-29 13:02:53 | 6 | 5 | 0 | 6.4 | 3.7 |
| 2018-04-29 11:07:55 | 7 | 5 | 1 | | 3.7 |
| 2018-04-26 23:30:38 | 5 | 2 | 1 | | 3.7 |
| 2018-04-26 22:53:19 | 8 | 5 | 0 | | 3.7 |
| 2018-04-26 20:28:17 | 6 | 5 | 0 | | 3.7 |

FIG. 9

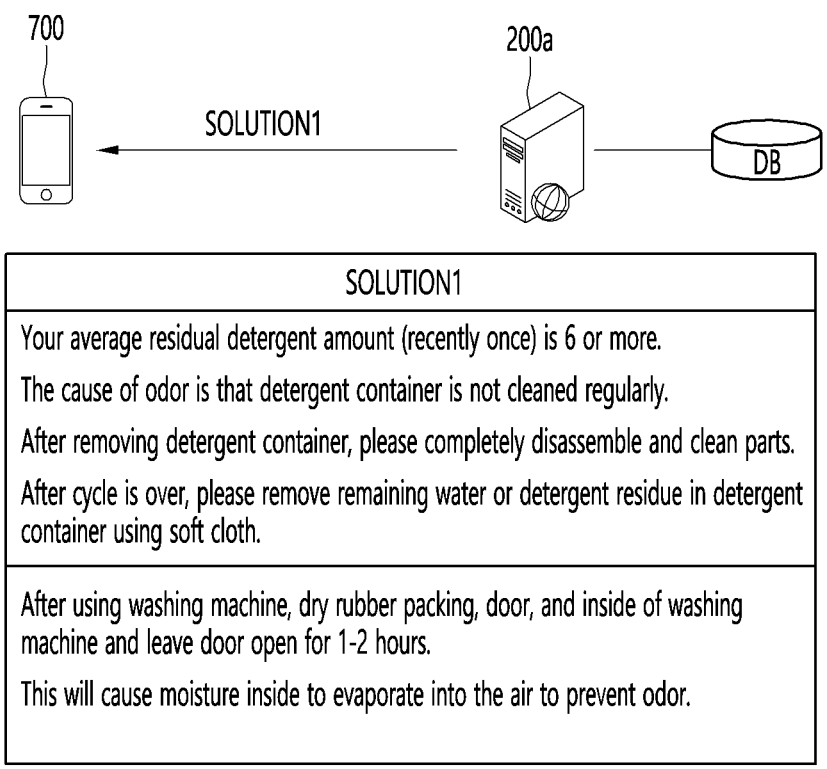

| SOLUTION1 |
|---|
| Your average residual detergent amount (recently once) is 6 or more.<br>The cause of odor is that detergent container is not cleaned regularly.<br>After removing detergent container, please completely disassemble and clean parts.<br>After cycle is over, please remove remaining water or detergent residue in detergent container using soft cloth. |
| After using washing machine, dry rubber packing, door, and inside of washing machine and leave door open for 1-2 hours.<br>This will cause moisture inside to evaporate into the air to prevent odor. |

FIG. 10

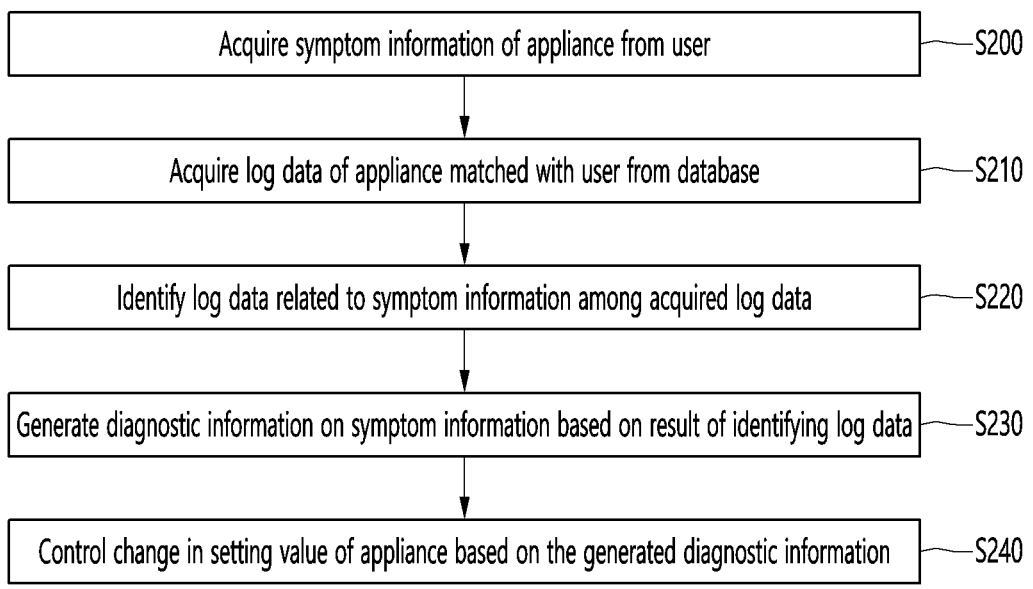

TABLE2

| | Classification | Symptom | Phenomenon |
|---|---|---|---|
| 1 | Washing performance | Washing is not well made | Identify average water level<br>Average water level <=7? |
| 2 | | | (Phenomenon 1 : NO)<br><br>Identify average current strength<br>Average water current strength <=2? |
| 3 | | | (Phenomenon 2 : NO) Normal |

| Laundry date | Water current strength | Clothing amount | Water level | Average water current strength | Average clothing amount | Average water level |
|---|---|---|---|---|---|---|
| 2018-04-29 13:02:53 | 0 | 5 | 5 |  | 3.7 |  |
| 2018-04-29 11:07:55 | 0 | 5 | 3 |  | 3.7 |  |
| 2018-04-26 23:30:38 | 2 | 2 | 5 | 0.8 | 3.7 | 4.4 |
| 2018-04-26 22:53:19 | 0 | 5 | 4 |  | 3.7 |  |
| 2018-04-26 20:28:17 | 0 | 5 | 5 |  | 3.7 |  |

ARTIFICIAL INTELLIGENCE-BASED APPLIANCE MANAGEMENT DEVICE AND APPLIANCE MANAGEMENT METHOD

CROSS-REFERENCE TO RELATED APPLICATIONS

This application is a National Stage application under 35 U.S.C. § 371 of International Application No. PCT/KR2019/008322, filed on Jul. 5, 2019. The disclosure of the prior application is incorporated by reference in its entirety.

TECHNICAL FIELD

The present disclosure relates to an AI (artificial intelligence)-based appliance management device and appliance management method.

BACKGROUND ART

Manufacturers of appliances operate counseling departments such as call centers and service centers for answer provision or service reception for inquiries, complaints, abnormal symptoms, or the like occurring while a user uses their appliances.

In conventional cases, counselors in the counseling departments listen to the description of the symptom from the user or sound occurring from the appliance through a phone call with the user, or directly listen to the description of the symptom from the user who visited the counseling department to make an inference based on the symptom of the appliance.

In this case, it may be difficult to accurately recognize the symptoms of the appliance, and accordingly, it is difficult to provide accurate diagnostic information on the symptom, reducing the treatment rate of symptoms. As a result, the user's satisfaction with counseling may decrease and even the reliability of the appliance may be lowered.

In addition, when the symptoms cannot be handled through the call center, even though the symptoms are simple, a technician such as a service technician needs to visit the user directly to solve the symptoms, which may significantly reduce efficiency and increase cost quality.

DISCLOSURE

Technical Problem

An object of the present disclosure is to provide an appliance management device and method capable of accurately diagnosing symptom information of an appliance received from a user through a call center or a service center.

Another object to be solved by the present disclosure is to provide an appliance management device and method capable of minimizing a user's actions related to resolution of the symptom information.

Technical Solution

According to an embodiment, an appliance management device includes a communication device configured to acquire symptom information of a first appliance from a user's terminal, a memory including a database for accumulatively storing log data of each of appliances matched with the user, and a processor, wherein the processor may acquire log data of the first appliance among the log data of each of the appliances of the user based on the acquired symptom information, identify at least one piece of information related to the symptom information among a plurality of pieces of information included in the acquired log data, generate diagnostic information on the symptom information based on a result of identification, and transmit the generated diagnostic information to the terminal.

The symptom information may be acquired in form of voice or text, and the processor may extract at least one keyword related to the symptom information from the voice or text, and identify a symptom matched with the extracted keyword among a plurality of symptoms stored in the memory.

According to an embodiment, the processor may acquire a preset number of pieces of log data stored at a time point closest to a current time point among the log data accumulatively stored for the first appliance, based on the acquired symptom information.

According to an embodiment, the processor may extract at least one piece of information from among the plurality of pieces of information included in the acquired log data based on at least one condition set for at least one piece of diagnostic information related to the symptom information.

According to an embodiment, the processor may determine first diagnostic information corresponding to a first condition as diagnostic information on symptom information of the first appliance, when the at least one extracted information satisfies the first condition among the at least one condition.

According to an embodiment, the memory may store a learning model trained based on machine learning, and the processor may acquire diagnostic information on the symptom information of the first appliance from the extracted at least one piece of information through the learning model.

The processor may update the learning model based on the extracted at least one piece of information and diagnostic information acquired through the learning model.

The processor may transmit a solution message included in the diagnosis information to the terminal, and the solution message may be provided in form of voice or text.

According to an embodiment, the processor may generate setting information for changing at least one setting value among setting items related to driving of the first appliance based on the generated diagnostic information, and control the communication device to transmit the generated setting information to the first appliance.

The processor may generate a notification indicating that at least one setting value among setting items related to driving of the first appliance has been changed according to transmission of the setting information, and transmit the generated notification to the terminal.

According to an embodiment, an appliance management method may acquiring symptom information of a first appliance of a user, acquiring log data of the first appliance among log data accumulatively stored for each of the appliances of the user based on the acquired symptom information, identifying at least one piece of information related to the symptom information among a plurality of pieces of information included in the acquired log data, generating diagnostic information on the symptom information based on a result of identification, and providing the generated diagnostic information to the user.

Advantageous Effects

According to an embodiment, when symptom information on a specific appliance is received from a user, the appliance management device according to an embodiment of the present disclosure may accurately diagnose the symptom information using the log data of the appliance. Therefore, it is possible to improve a processing rate and consultation satisfaction for the symptom information received from the user and prevent a decrease in reliability for products.

In addition, the appliance management device may remotely change a setting value related to the operation of the appliance based on the diagnosis on the symptom information. The user may identify that the symptom of the appliance is smoothly resolved without directly performing a predetermined action for resolving the symptom information. Accordingly, the user's satisfaction with the appliance and the manufacturer of the appliance may be maximized. In addition, since the manufacturer may effectively solve the above symptoms without providing a separate management manpower, enabling more efficient after-sales service operation.

DESCRIPTION OF DRAWINGS

FIGS. 7 to 9 are exemplary diagrams related to a control operation of the appliance management device shown in FIG. 10.

FIG. 10 is a flowchart for describing a control operation of an appliance management device according to another embodiment of the present disclosure.

MODE FOR INVENTION

Figure 1:
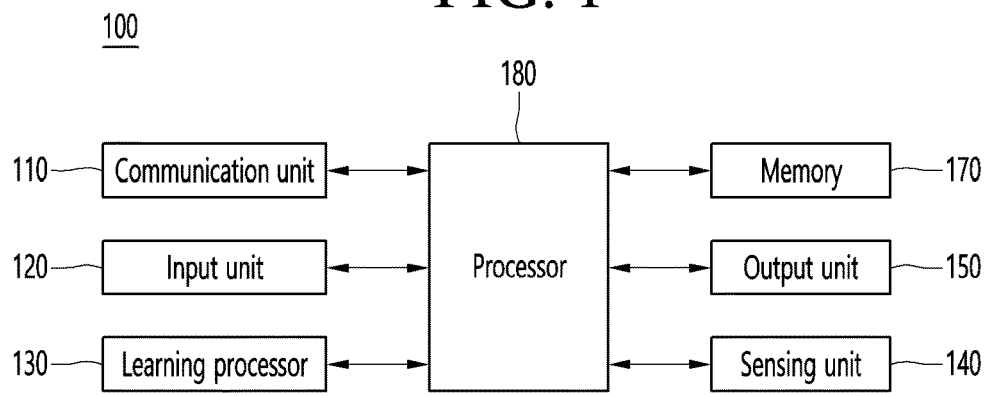
FIG. 1 illustrates an AI device according to an embodiment of the present disclosure.

Hereinafter, the embodiments disclosed herein will be described in detail with reference to the accompanying drawings, and the same or similar elements are designated with the same numeral references regardless of the numerals in the drawings and their redundant description will be omitted. The suffixes "module" and "unit or portion" for components used in the following description are merely provided only for facilitation of preparing this specification, and thus they are not granted a specific meaning or function. In addition, when it is determined that the detailed description of the related known technology may obscure the gist of embodiments disclosed herein in describing the embodiments, a detailed description thereof will be omitted. Further, the accompanying drawings are intended to facilitate understanding of the embodiments disclosed herein, and the technical spirit disclosed herein are not limited by the accompanying drawings. Therefore, the present disclosure should be construed as including all the changes, equivalents, and substitutions included in the spirit and scope of the present disclosure.

The terms coming with ordinal numbers such as 'first', 'second', or the like may be used to denote various components, but the components are not limited by the terms. The terms are used merely for the purpose to distinguish a component from the other component.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
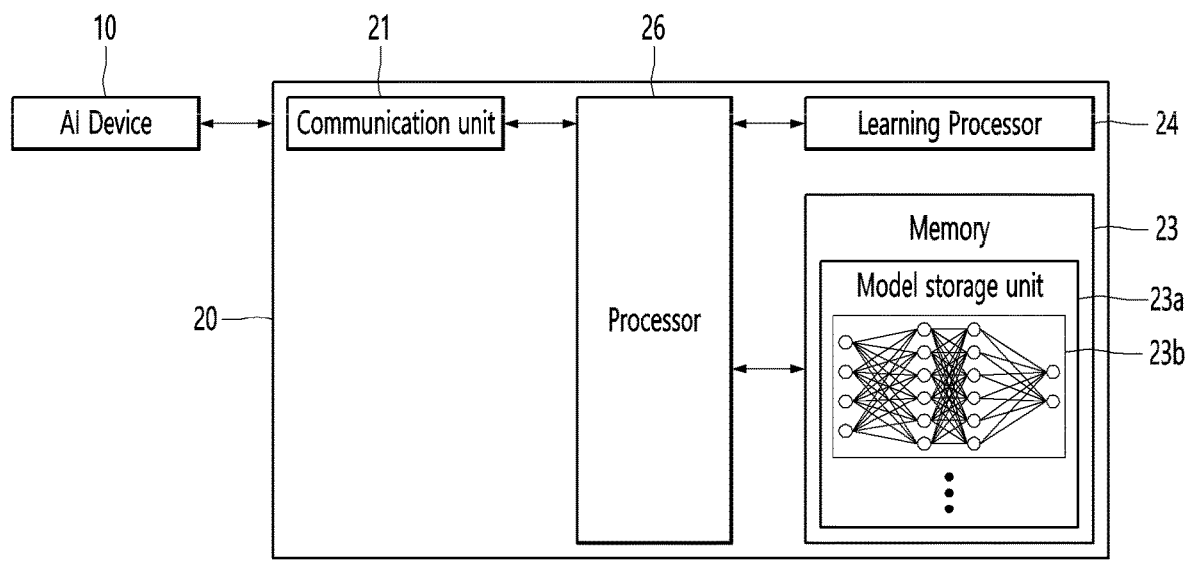
FIG. 2 illustrates an AI server according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231*a*) through the learning processor 240.

The learning processor 240 may learn the artificial neural network 231*a* by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
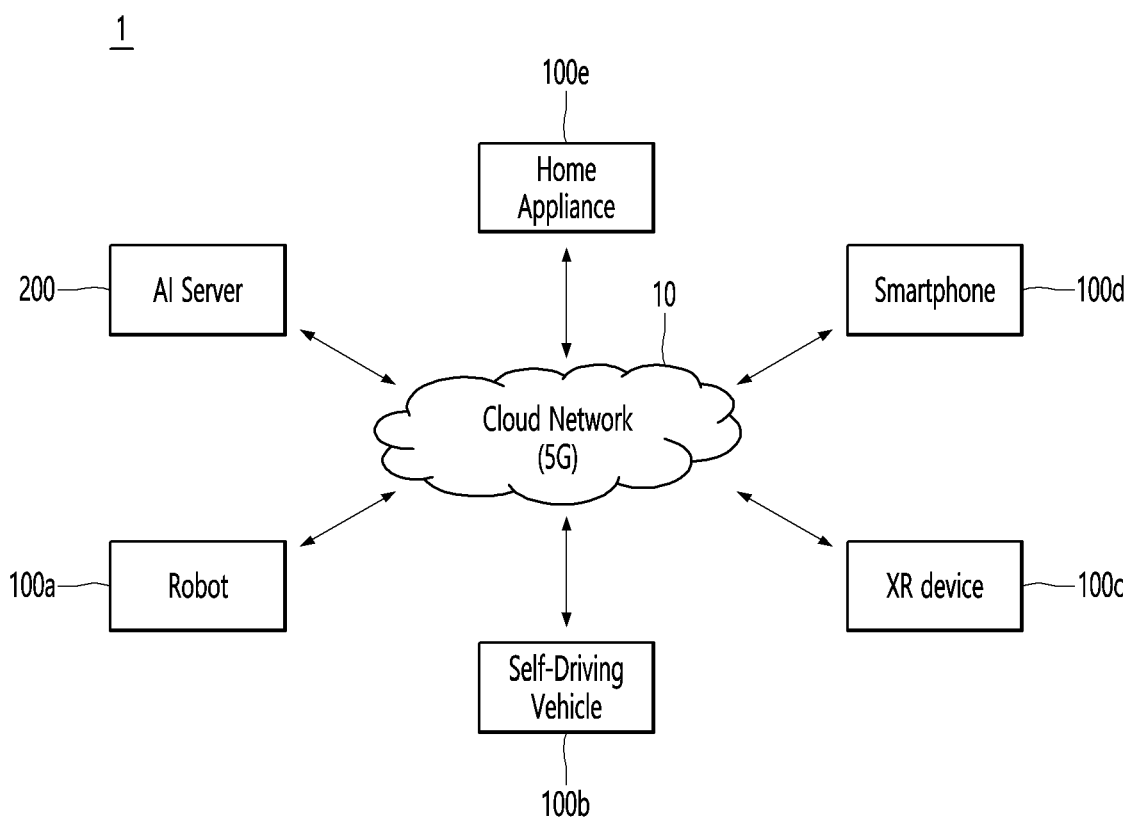
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI devices 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100*a* to 100*e* and 200 configuring the AI system 1 may be connected to each other through the cloud network 10. In particular, each of the devices 100*a* to 100*e* and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and may assist at least part of AI processing of the connected AI devices 100*a* to 100*e*.

At this time, the AI server 200 may learn the artificial neural network according to the machine learning algorithm instead of the AI devices 100*a* to 100*e*, and may directly store the learning model or transmit the learning model to the AI devices 100*a* to 100*e*.

At this time, the AI server 200 may receive input data from the AI devices 100*a* to 100*e*, may infer the result value for the received input data by using the learning model, may generate a response or a control command based on the inferred result value, and may transmit the response or the control command to the AI devices 100*a* to 100*e*.

Alternatively, the AI devices 100*a* to 100*e* may infer the result value for the input data by directly using the learning model, and may generate the response or the control command based on the inference result.

Hereinafter, various embodiments of the AI devices 100*a* to 100*e* to which the above-described technology is applied will be described. The AI devices 100*a* to 100*e* illustrated in FIG. 3 may be regarded as a specific embodiment of the AI device 100 illustrated in FIG. 1.

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
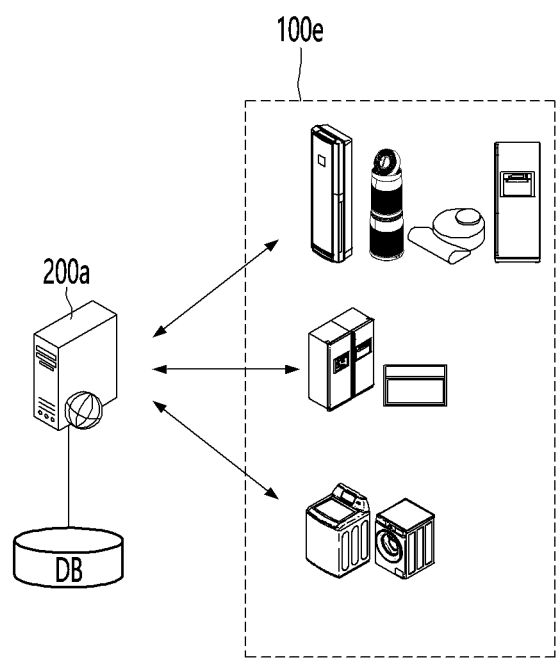
FIG. 4 is a conceptual diagram of an appliance management device according to an embodiment of the present disclosure.
Figure 5:
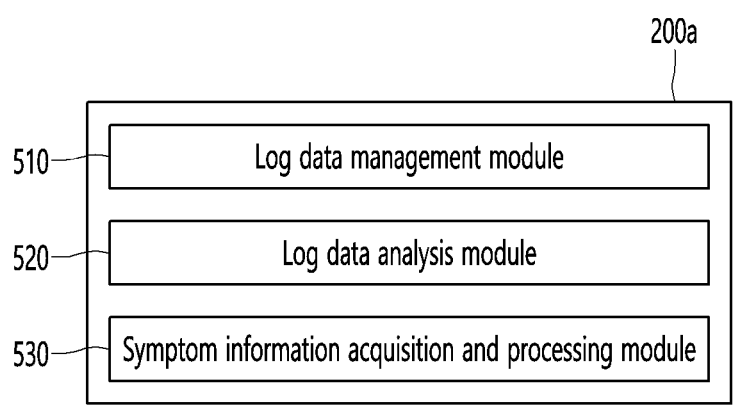
FIG. 5 is a diagram illustrating an example of a configuration related to the operation of the appliance management device shown in FIG. 4.

FIG. 4 is a conceptual diagram of an appliance management device according to an embodiment of the present disclosure. FIG. 5 is a diagram illustrating an example of a configuration related to the operation of the appliance management device shown in FIG. 4.

Referring to FIG. 4, an appliance management device 200a may correspond to an embodiment of the AI server 200 described above in FIG. 2. That is, the configurations and related descriptions of the AI server 200 shown in FIG. 2 may be similarly applied to the appliance management device 200a according to an embodiment of the present disclosure.

That is, the appliance management device 200a may be implemented as a kind of server. In addition, although the appliance management device 200a is illustrated in the form of one device in FIG. 4, the appliance management device 200a may be implemented by being divided into a plurality of devices according to an embodiment.

The appliance management device 200a may be connected to the appliances 100e of a plurality of users, and may accumulatively acquire log data generated when the appliances 100e are driven. In the following specification, it is assumed that the appliances 100e are home appliances used at home, but the types of appliances are not limited to the home appliances.

The log data may include various types of information acquired while the appliance 100e is driven. For example, when the appliance 100e is a washing machine, the log data may include various information related to components or driving environment included in a washing machine, such as washing machine course information, error information, water temperature information, water flow strength information, water level information, rinsing number information, spin-drying option information, door opening information, residual detergent amount information in a detergent container, or the like.

The appliance management device 200a may store and manage accumulatively acquired log data in a database. That is, the appliance management device 200a may collect and manage log data of various appliances respectively corresponding to a plurality of users, thereby utilizing the log data in various ways, such as improving the appliances.

Referring to FIG. 5, the appliance management device 200a may include a log data management module 510 that accumulatively acquires and manages the log data. The log data management module 510 may receive log data, generated when the appliances are driven, from appliances respectively corresponding to registered users. The log data management module 510 may store and manage the received log data in a database.

Meanwhile, the appliance management device 200a may acquire symptom information of an appliance 100e from a user (from a terminal or the appliance). The symptom information may include abnormal symptoms or phenomena, errors, and inquiries related to specific functions which are occurring during use of the appliance 100e.

The appliance management device 200a may more accurately recognize the symptom information by using log data related to the symptom information among the log data acquired from the user's appliance and stored in the database. In addition, accurate diagnosis information on the symptom information may be provided to the user by using the log data.

In this regard, the appliance management device 200a may include a log data analysis module 520 and a symptom information acquisition and processing module 530.

The symptom information acquisition and processing module 530 may acquire symptom information of the appliance 100e from the user. The symptom information acquisition and processing module 530 may recognize an information item to be checked from among information items included in the log data of the appliance 100e, based on the acquired symptom information.

The log data analysis module 520 may acquire the log data of the appliance 100e from among pieces of log data of the appliances of the users, which are stored in the database. The log data analysis module 520 may identify the recognized information item among the information items included in the acquired log data.

According to an embodiment, the log data analysis module 520 may acquire and identify only a preset number of pieces of recently-stored log data among the log data accumulatively stored for the appliance 100e.

The log data analysis module 520 may transmit a result of the identification of the log data to the symptom information acquisition and processing module 530.

The symptom information acquisition and processing module 530 may generate diagnostic information on the symptom information of the appliance 100e based on the result of the identification, and provide the generated diagnostic information to the user. According to an embodiment, the diagnostic information may be generated by the log data analysis module 520.

The log data management module 510, the log data analysis module 520, and the symptom information acquisition and processing module 530 illustrated in FIG. 5 may be implemented in one appliance management device 200a.

Alternatively, at least one of the log data management module 510, the log data analysis module 520, and the symptom information acquisition and processing module 530 may be implemented in a manner of being distributed in different devices. In this case, the appliance management device 200a may be defined as an appliance management system.

Hereinafter, embodiments related to the operation of the appliance management device 200a will be described with reference to FIGS. 6 to 14.

For convenience of description, it is assumed in the drawings that the log data management module 510, the log data analysis module 520, and the symptom information acquisition and processing module 530 are implemented in one appliance management device 200a. In this case, the operations of the modules 510, 520, and 530 may be performed under the control of the processor 260.

Figure 6:
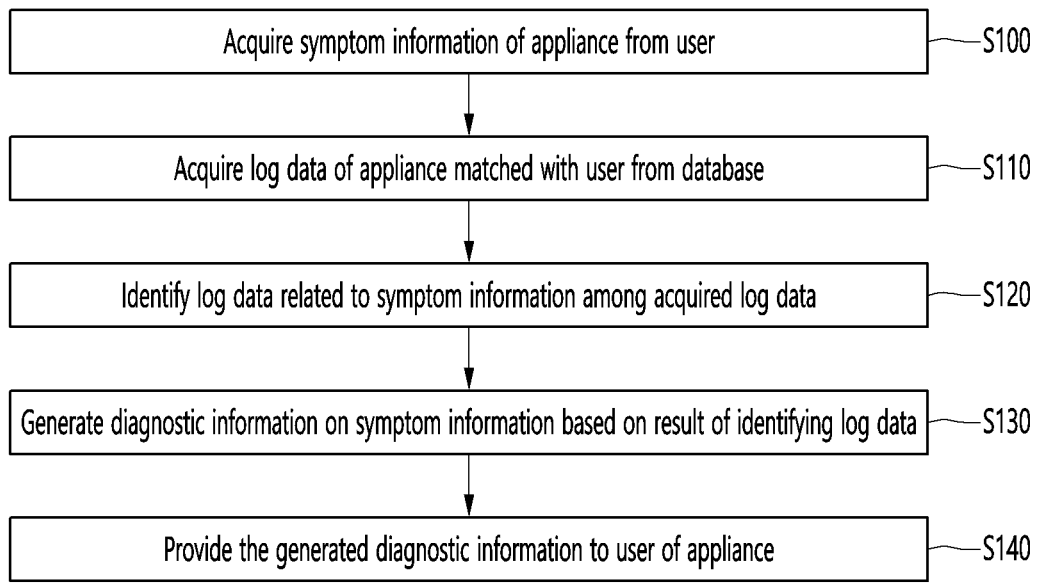
FIG. 6 is a flowchart for describing a control operation of an appliance management device according to an embodiment of the present disclosure.

FIG. 6 is a flowchart for describing a control operation of an appliance management device according to an embodiment of the present disclosure.

Referring to FIG. 6, the appliance management device 200a may acquire symptom information indicating a symptom of the appliance 100e from a user (S100).

The processor 260 of the appliance management device 200a may acquire symptom information of a predetermined appliance 100e owned by the user from the user's terminal or appliance. For example, the symptom information may be acquired in the form of speech or text.

For example, when the symptom information is acquired in the form of voice, the processor 260 may acquire the symptom information by converting the acquired speech into text through various known speech recognition techniques.

For example, the memory 270 may store a list (or table) of a plurality of symptoms related to the appliance 100e and at least one diagnostic information corresponding to each of the symptoms. The processor 260 may extract at least one keyword from the text including the symptom information, and match the extracted keyword with any one of a plurality of symptoms stored in the memory 270. The processor 260 may load a list (or table) including the matched symptom and at least one piece of diagnostic information corresponding to the symptom.

The appliance management device 200a may acquire log data of the appliance 100e matched with the user, from the database (S110).

The processor 260 may load log data of the appliance 100e matched with the user, from among log data of a plurality of users stored in the database, based on the identification information of the user's terminal or appliance that has transmitted the symptom information, or the user's identification information (ID or the like) transmitted together with the symptom information.

According to an embodiment, the processor 260 may load only a preset number of pieces of recently-stored log data among a plurality of pieces of log data accumulatively stored for the appliance 100e.

The appliance management device 200a may identify log data related to the symptom information among the acquired log data (S120).

The log data of the appliance 100e may include various information items related to the configuration or operating environment of the appliance 100e.

The processor 260 may identify information (e.g., a value, etc.) corresponding to at least one information item related to the symptom information among the information items included in the log data. Relevant examples will be described later with reference to FIGS. 7 to 8 and 11 to 12.

The appliance management device 200a may generate diagnostic information on the symptom information based on a result of identifying log data related to the symptom information (S130). The appliance management device 200a may provide the generated diagnostic information to the user (S140).

The processor 260 may acquire diagnostic information on the symptom information according to a result of identifying at least one piece of information related to the symptom information.

The diagnosis information may include information related to a cause of the symptom information and/or information on a solution of the symptom information.

Meanwhile, the cause of the symptom information may not be limited to any one, and in this case, there may also be a plurality of solutions for the symptom information.

Accordingly, the memory 270 may store a plurality of pieces of diagnostic information on the symptom information.

The processor 260 may acquire one piece of diagnostic information from among the plurality of pieces of diagnostic information, according to a result of identifying at least one piece of information related to the symptom information. For example, each of the plurality of pieces of diagnostic information may have a condition related to information (value) corresponding to each of the at least one information item. When there is diagnostic information satisfying a specific condition as a result of identifying the at least one piece of information, the processor 260 may acquire the diagnostic information as diagnostic information on the symptom information of the appliance 100e of the user.

According to an embodiment, the processor 260 may input the at least one piece of information into a learning model stored in the memory 270. The learning model may refer to a model (e.g., an artificial neural network) trained based on machine learning (e.g., deep learning) by the learning processor 240 or the like. The learning model may output a probability value of each of a plurality of pieces of diagnostic information on the symptom information based on the at least one piece of information which is input. The processor 260 may acquire the diagnostic information having the highest probability value as diagnostic information on the symptom information of the appliance 100e.

The processor 260 may provide the acquired diagnostic information to the user. For example, the processor 260 may transmit text or speech data including the acquired diagnostic information to the user's terminal or appliance. The user may solve the symptom of the appliance 100e based on the diagnostic information included in the text or speech data.

Figure 7:
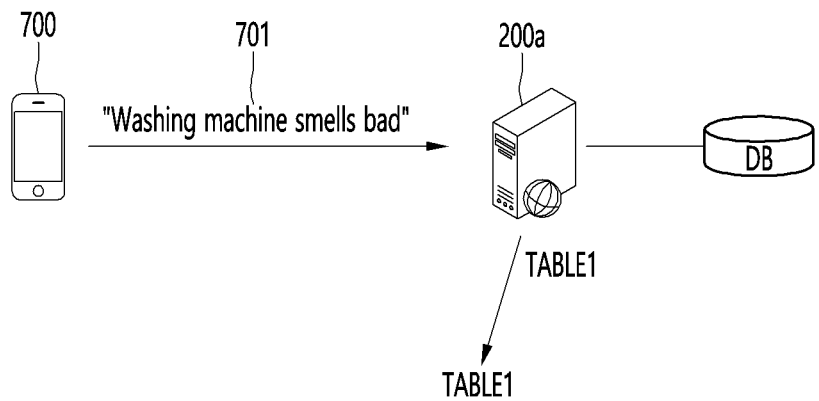
Figure 8:
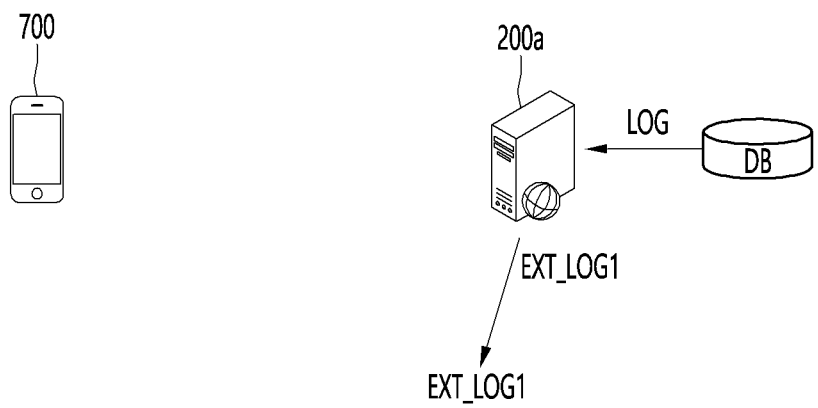

FIGS. 7 to 9 are exemplary views related to the control operation of the appliance management device shown in FIG. 6.

Referring to FIG. 7, the processor 260 of the appliance management device 200a (or a symptom reception and processing module 530) may acquire speech or text including first symptom information 701 from the user's terminal 700. For example, the first symptom information 701 may indicate a symptom that the washing machine smells.

The processor 260 may acquire the first symptom information 701 from the acquired speech or text data.

The processor 260 may acquire a first symptom information table TABLE1 corresponding to the acquired first symptom information 701 from among a plurality of appliance-specific symptom information tables stored in the memory 270.

The processor 260 may recognize at least one information item related to the first symptom information 701 among information items included in the log data based on the acquired first symptom information table TABLE1. For example, the processor 260 may recognize that the processor 260 needs to identify information (value) of an information item related to the residual detergent amount and the information (value) of an information item related to door opening, among the log data, based on a phenomenon item of the first symptom information table TABLE1. The phenomenon item may include a condition for each of the at least one piece of diagnostic information related to the first symptom information 701. In the embodiment of FIG. 7, the condition may include a first condition that the average residual detergent amount is 6 or more and a second condition that the number of door openings is 3 or less.

Referring to FIG. 8, the processor 260 (or the log data management module 510) may load log data LOG of a washing machine matched with the user of the terminal 700 among the appliance-specific log data of a plurality of users stored in the database.

According to an embodiment, the processor 260 may load only a predetermined number (e.g., five) of pieces of log data LOG stored at a time point closest to a current time point among log data of the washing machine matched with the user of the terminal 700.

The processor 260 (or the log data analysis module 520) may extract log data EXT_LOG1 including at least one information item recognized based on the first symptom information table TABLE1 from among the loaded log data LOG.

Referring to an example shown in FIG. 8, the extracted log data EXT_LOG1 may include residual detergent amount information, clothing amount information, and door opening information for each of the five pieces of log data stored at the time point closest to the current time point.

The processor 260 (or the log data analysis module 520) may calculate an average residual detergent amount based on the residual detergent amount information of the extracted log data EXT_LOG1 based on the first symptom information table TABLE1. Further, the processor 260 may calculate the total number of door openings.

Referring to FIGS. 7 and 8, the processor 260 (the log data analysis module 520 or the symptom information acquisition and processing module 530) may identify that the calculated average residual detergent amount satisfies the first condition (the average residual detergent amount is 6 or more) stored in the first symptom information table TABLE1 because the calculated average residual detergent amount is 6.4. Also, since the calculated number of door openings is 2, the processor 260 may identify that the calculated number of door openings satisfies the second condition (the number of door openings is 3 or less) stored in the first symptom information table TABLE1 is satisfied.

Based on a result of identification, the processor 260 may acquire first diagnostic information corresponding to a first condition and second diagnostic information corresponding to a second condition from among the plurality of pieces of diagnostic information corresponding to the symptom information 701. That is, the diagnosis information according to the symptom information 701 (occurrence of odor) of the user's washing machine may correspond to the first diagnosis information and the second diagnosis information.

According to an embodiment, the processor 260 may acquire diagnostic information corresponding to values included in the extracted log data EXT_LOG1 through a learning model (e.g., an artificial neural network) trained based on machine learning.

Further, the processor 260 may perform a learning operation on the learning model based on the values included in the extracted log data EXT_LOG1 and the acquired diagnosis information.

Referring to FIG. 9, the processor 260 (or the symptom information acquisition and processing module 530) may transmit the first diagnostic information and the second diagnostic information to the user's terminal 700.

For example, the processor 260 may transmit solution data SOLUTION1 including a first solution message included in the first diagnostic information and a second solution message included in the second diagnostic information to the terminal 700. The first solution message and the second solution message may be provided in the form of speech or text.

The user may effectively remove the symptom by using the washing machine based on the solution data SOLUTION1.

That is, when symptom information on a specific appliance is received from a user, the appliance management device 200a according to an embodiment of the present disclosure may use log data of the appliance to accurately diagnose the symptom information. Therefore, it is possible to improve a processing rate and consultation satisfaction for the symptom information received from the user and prevent a decrease in reliability for products.

FIG. 10 is a flowchart for describing a control operation of an appliance management device according to another embodiment of the present disclosure.

Referring to FIG. 10, steps S200 to S230 are substantially the same as steps S100 to S130 in FIG. 6, so that descriptions thereof will be omitted.

The appliance management device 200a may change a setting value (a setting environment or the like) of an appliance corresponding to the acquired symptom information based on the diagnostic information generated in step S230 (S240).

The processor 260 may remotely process the symptom information without user actions by adjusting a basic setting value related to the operation of the appliance based on the diagnosis information.

That is, the processor 260 may transmit setting information for changing a setting value of the appliance to the appliance connected to the appliance management device 200a. The appliance may prevent the occurrence of symptoms according to the symptom information by changing a setting value based on the received setting information.

FIGS. 11 to 14 are exemplary diagrams related to a control operation of the appliance management device shown in FIG. 10.

Figure 11:
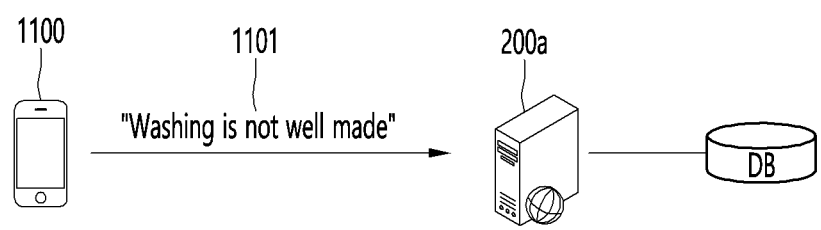
FIGS. 11 to 14 are exemplary diagrams related to a control operation of the appliance management device shown in FIG. 10.

Referring to FIG. 11, the processor 260 (or the symptom reception and processing module 530) of the appliance management device 200a may acquire a speech or text including the second symptom information 1101 from the user's terminal 1100. For example, the second symptom information 1101 may indicate a symptom corresponding to a decrease in washing performance of a washing machine.

The processor 260 may acquire the second symptom information 1101 from the acquired speech or text data.

The processor 260 may acquire a second symptom information table TABLE2 corresponding to the acquired second symptom information 1101 from among a plurality of appliance-specific symptom information tables stored in the memory 270.

The processor 260 may recognize at least one information item related to the second symptom information 1101 among information items included in log data, based on the acquired second symptom information table TABLE2. For example, the processor 260 may recognize that the processor 260 needs to identify information (value) of an information item related to a water level and the information (value) of an information item related to a water current strength, among the log data, based on a phenomenon item of the second symptom information table TABLE2.

Figure 12:
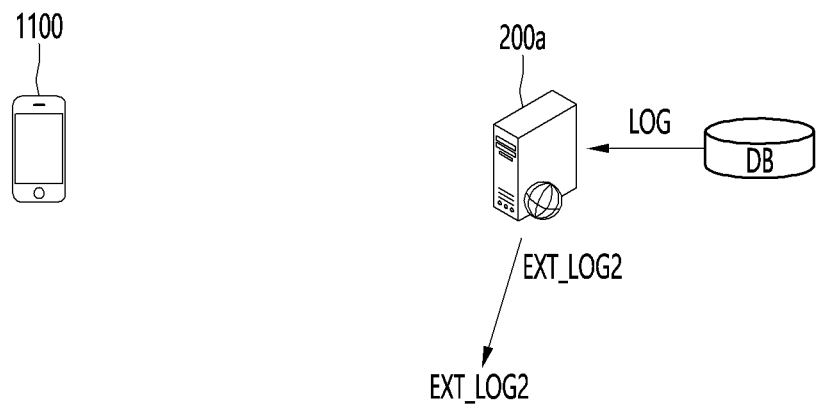

Referring to FIG. 12, the processor 260 (or the log data management module 510) may perform log data (LOG) of a washing machine matched with the user of the terminal 1100 among log data for each appliance of a plurality of users stored in the database.

According to an embodiment, the processor 260 may load only a predetermined number (e.g., five) of pieces of log data LOG stored at a time point closest to a current time point among log data of the washing machine matched with the user of the terminal 1100.

The processor 260 (or the log data analysis module 520) may extract log data EXT_LOG2 including at least one information item recognized based on the second symptom information table TABLE2 from among the loaded log data LOG.

Referring to an example shown in FIG. 12, the extracted log data EXT_LOG2 may include water current strength information, clothing amount information, and water level information for each of the five pieces of log data stored at the time point closest to the current time point.

The processor 260 (or the log data analysis module 520) may calculate an average water current strength from the water current strength information of the extracted log data EXT_LOG2 based on the second symptom information table TABLE2. Further, the processor 260 may calculate an average water level from the water level information.

Referring to FIGS. 11 and 12, since the calculated average water level is 4.4, the processor 260 (the log data analysis module 520 or the symptom information acquisition and processing module 530) may identify that the calculated average water level satisfies the first condition (the average water level is 7 or less) stored in the second symptom information table TABLE2. In addition, since the calculated average water current strength is 0.8, the processor 260 may identify that the calculated average water current strength satisfies the second condition (the average water current strength is 2 or less) stored in the second symptom information table TABLE2 is satisfied.

Based on the result of the identification, the processor 260 may acquire first diagnostic information corresponding to the first condition and second diagnostic information corresponding to the second condition among a plurality of pieces of diagnostic information corresponding to the second symptom information 1101.

That is, the diagnosis information according to the symptom information 1101 (a decrease in washing performance) of the user's washing machine may correspond to the first diagnosis information and the second diagnosis information.

Figure 13:
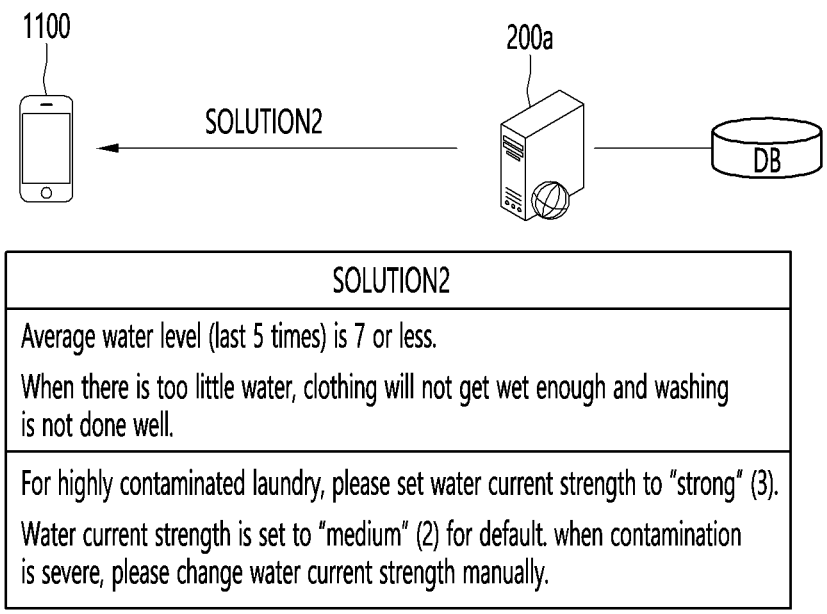

Referring to FIG. 13, the processor 260 (or the symptom information acquisition and processing module 530) may transmit the first diagnostic information and the second diagnostic information to the user's terminal 700.

For example, the processor 260 may transmit solution data SOLUTION2 including a first solution message included in the first diagnostic information and a second solution message included in the second diagnostic information to the terminal 700. The first solution message and the second solution message may be provided in the form of speech or text.

The user may remove the symptom by using the washing machine based on the solution data SOLUTION2.

Figure 14:
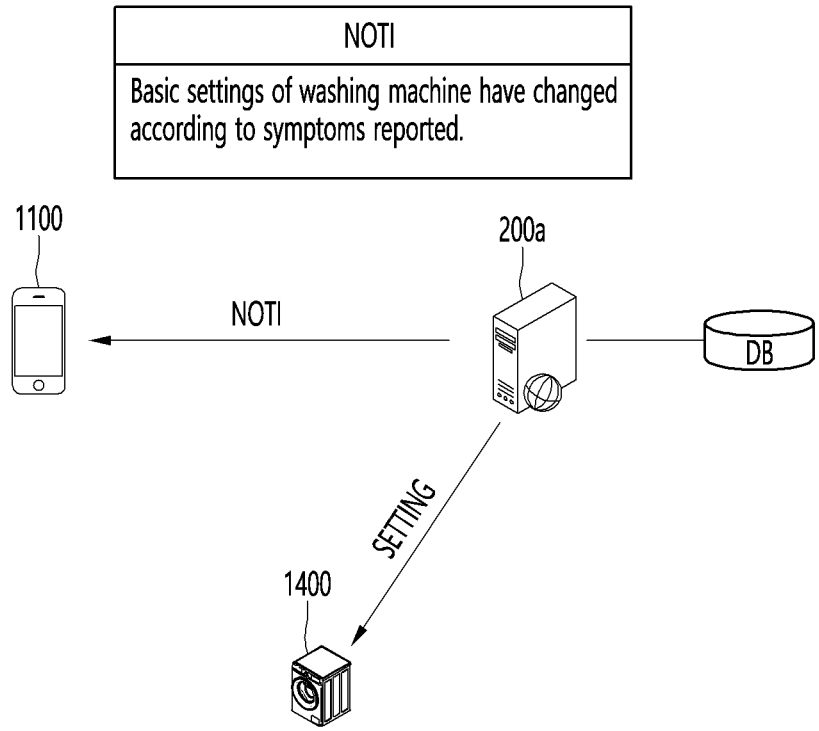

Meanwhile, referring to FIG. 14, the processor 260 (or the symptom information acquisition and processing module 530) may change a basic setting value when the washing machine 1400 is driven, based on the acquired diagnosis information.

The processor 260 may generate setting information SETTING for changing at least one setting value among setting items related to the identified information item, and transmit the generated setting information SETTING to the appliance.

For example, the processor 260 may increase the basic setting value for the water current strength, generate the setting information SETTING for increasing the basic setting value for a water level, and transmit the generated setting information SETTING to the washing machine 1400.

The washing machine 1400 may change the basic setting value for each of the water current strength and the water level based on the received setting information SETTING. Accordingly, when the washing machine 1400 is driven, the water current strength and the water level are increased, so that it is possible to solve the symptom of the decrease in washing performance.

Meanwhile, the processor 260 may generate a notification NOTI indicating that the basic setting value of the washing machine 1400 has been changed according to the symptom information, and transmit the generated notification NOTI to the user's terminal 1100. For example, the notification NOTI may be provided in the form of speech or text.

The user may recognize that the processing of the symptom information has been completed by identifying the notification, and may identify that the symptom information is resolved by driving the washing machine 1400.

That is, according to the embodiment shown in FIGS. 10 to 14, the appliance management device 200a may acquire diagnostic information according to symptom information of the appliance acquired from the user, and remotely change a setting value related to the driving of the appliance based on the acquired diagnostic information. The user may identify that the symptom of the appliance is smoothly resolved without directly performing a predetermined action for resolving the symptom information. Accordingly, the user's satisfaction with the appliance and the manufacturer of the appliance may be maximized. In addition, since the manufacturer may effectively solve the above symptoms without providing a separate management manpower, enabling more efficient after-sales service operation.

The above description is merely illustrative of the technical idea of the present disclosure, and various modifications and variations may be made without departing from the essential characteristics of the present disclosure by those skilled in the art to which the present disclosure pertains.

Accordingly, the embodiment disclosed in the present disclosure is not intended to limit the technical idea of the present disclosure but to describe the present disclosure, and the scope of the technical idea of the present disclosure is not limited by the embodiment.

The scope of protection of the present disclosure should be interpreted by the following claims, and all technical ideas within the scope equivalent thereto should be construed as being included in the scope of the present disclosure.

The invention claimed is:

1. An appliance management device comprising:
   a communication device configured to receive, from a terminal, user input indicative of symptom information of a first appliance among a plurality of appliances;
   a memory including a database configured to store log data of each of the plurality of appliances matched with a user of the terminal; and
   a processor configured to:
   determine diagnostic information of the first appliance based on (i) the user input indicative of the symptom information, (ii) first symptom information table data, and (iii) log data of the first appliance,
   generate, based on the diagnostic information, an operational parameter related to an operation of the first appliance, and
   control the communication device to transmit the operational parameter to the first appliance to thereby control the operation of the first appliance based on the operational parameter,
   wherein determining the diagnostic information comprises:
   determining, based on at least one keyword being extracted from the user input, the first symptom information table data among a plurality of symptom information table data,
   acquiring, from the database, the log data of the first appliance among the log data of the plurality of appliances based on the symptom information,
   identifying, based on a diagnostic condition indicated in the first symptom information table data, at least one piece of information related to the diagnostic condition among a plurality of pieces of information included in the acquired log data, and
   generating the diagnostic information on the symptom information based on a result of the identification.

2. The appliance management device of claim 1, wherein the user input indicative of the symptom information is received in form of voice or text,
   wherein the processor is configured to:
   extract the at least one keyword related to the symptom information from the voice or text, and identify a symptom matched with the extracted keyword among a plurality of symptoms stored in the memory.

3. The appliance management device of claim 1, wherein the processor is configured to acquire a preset number of pieces of log data stored among the log data stored for the first appliance based on the symptom information, the log data of the preset number of pieces being most recently stored log data.

4. The appliance management device of claim 1, wherein the processor is configured to extract the at least one piece of information from among the plurality of pieces of information included in the acquired log data based on at least one condition assigned to at least one piece of diagnostic information related to the symptom information.

5. The appliance management device of claim 4, wherein the processor is configured to, based on the extracted at least one information satisfying a first condition among the at least one condition, determine first diagnostic information corresponding to the first condition as the diagnostic information on the symptom information of the first appliance.

6. The appliance management device of claim 4, wherein the memory is configured to store a learning model trained based on machine learning, and
wherein the processor is configured to acquire diagnostic information on the symptom information of the first appliance from the extracted at least one piece of information through the learning model.

7. The appliance management device of claim 6, wherein the processor is configured to update the learning model based on the extracted at least one piece of information and the diagnostic information acquired through the learning model.

8. The appliance management device of claim 1, wherein the processor is configured to control the communication device to transmit, to the terminal, a solution message included in the diagnosis information, and
wherein the solution message is provided in form of voice or text.

9. The appliance management device of claim 1, wherein generating the operational parameter comprises:
generating setting information for changing at least one setting value among setting items related to an operation of the first appliance based on the generated diagnostic information, and
wherein controlling the communication device to transmit the operational parameter to the first appliance to thereby control the operation of the first appliance based on the operational parameter comprises:
controlling the communication device to transmit the generated setting information to the first appliance to thereby control the operation of the first appliance based on the setting information.

10. The appliance management device of claim 9, wherein the processor is configured to:
generate a notification indicating that the at least one setting value among the setting items related to the operation of the first appliance has been changed according to the transmission of the setting information, and
control the communication device to transmit the generated notification to the terminal.

11. An appliance management method comprising:
receiving, from a terminal, user input indicative of symptom information of a first appliance among a plurality of appliances associated with a user;
determining diagnostic information of the first appliance based on (i) the user input indicative of the symptom information, (ii) first symptom information table data, and (iii) log data of the first appliance;
generating, based on the diagnostic information, an operational parameter related to an operation of the first appliance; and
transmitting the operational parameter to the first appliance to thereby control the operation of the first appliance based on the operational parameter,
wherein determining diagnostic information comprises:
determining, based on at least one keyword being extracted from the user input, the first symptom information table data among a plurality of symptom information table data,
acquiring the log data of the first appliance among log data stored for each of the plurality of appliances based on the received symptom information,
identifying, based on a diagnostic condition indicated in the first symptom information table data, at least one piece of information related to the diagnostic condition among a plurality of pieces of information included in the acquired log data by, and
generating, by a processing module, the diagnostic information on the symptom information based on a result of the identification.

12. The appliance management method of claim 11, wherein receiving the user input indicative of the symptom information includes receiving the symptom information in form of voice or text from a user's terminal or the first appliance.

13. The appliance management method of claim 11, wherein acquiring the log data of the first appliance includes acquiring a preset number of pieces of log data among the log data stored for the first appliance, the log data of the preset number of pieces being most recently stored log data.

14. The appliance management method of claim 11, wherein identifying the least one piece of information includes:
extracting the at least one piece of information from among the plurality of pieces of information included in the acquired log data based on at least one condition assigned to at least one piece of diagnostic information related to the symptom information, and
determining whether a satisfied condition exists among the at least one condition using the extracted at least one piece of information.

15. The appliance management method of claim 14, wherein generating the diagnostic information includes determining, based on the extracted at least one information satisfying a first condition among the at least one condition, first diagnostic information corresponding to the first condition as the diagnostic information on the symptom information.

16. The appliance management method of claim 14, wherein identifying the least one piece of information includes:
acquiring diagnostic information on the symptom information of the first appliance from the extracted at least one piece of information through a learning model.

17. The appliance management method of claim 16, wherein identifying the least one piece of information includes:
updating the learning model based on the extracted at least one piece of information and the diagnostic information acquired through the learning model.

18. The appliance management method of claim 11, comprising:
  providing the diagnostic information to the user by transmitting, to a user's terminal, a solution message included in the diagnosis information in form of voice or text.

19. The appliance management method of claim 11, wherein generating the operational parameter comprises:
  generating setting information for changing at least one setting value among setting items related to an operation of the first appliance based on the generated diagnostic information, and
  wherein transmitting the operational parameter to the first appliance to thereby control the operation of the first appliance based on the operational parameter comprises:
  transmitting the generated setting information to the first appliance to thereby control the operation of the first appliance based on the setting information.

20. The appliance management method of claim 19, further comprising:
  generating a notification indicating that the at least one setting value among the setting items related to the operation of the first appliance has been changed according to the transmission of the setting information, and
  transmitting the generated notification to a user's terminal.

* * * * *